(12) United States Patent
Isitman et al.

(10) Patent No.: US 11,591,454 B2
(45) Date of Patent: Feb. 28, 2023

(54) PNEUMATIC TIRE

(71) Applicant: The Goodyear Tire & Rubber Company, Akron, OH (US)

(72) Inventors: Nihat Ali Isitman, Hudson, OH (US); Marine Sophie Francoise Wassen, Mersch (LU); Ronda Jane Hinterlong, Macedonia, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 175 days.

(21) Appl. No.: 15/931,636

(22) Filed: May 14, 2020

(65) Prior Publication Data

US 2021/0355301 A1 Nov. 18, 2021

(51) Int. Cl.
| | |
|---|---|
| *C08L 9/06* | (2006.01) |
| *C08L 91/00* | (2006.01) |
| *C08L 45/02* | (2006.01) |
| *C08K 3/36* | (2006.01) |
| *C08K 5/101* | (2006.01) |
| *B60C 1/00* | (2006.01) |
| *C08K 3/04* | (2006.01) |

(52) U.S. Cl.
CPC ........... *C08L 9/06* (2013.01); *B60C 1/0016* (2013.01); *C08K 3/36* (2013.01); *C08K 5/101* (2013.01); *C08L 45/02* (2013.01); *C08L 91/00* (2013.01); *C08K 3/04* (2013.01)

(58) Field of Classification Search
CPC ............ C08L 91/00; C08L 9/06; C08L 45/02; C08K 3/36; C08K 5/101; B60C 1/00
USPC ........................................................ 523/156
See application file for complete search history.

(56) References Cited

U.S. PATENT DOCUMENTS

| | | | |
|---|---|---|---|
| 10,336,889 B2 | 7/2019 | Isitman et al. | |
| 2017/0114212 A1 | 4/2017 | Pompei et al. | |
| 2017/0145195 A1* | 5/2017 | Isitman | C08L 9/06 |
| 2017/0349733 A1* | 12/2017 | Isitman | C08K 3/36 |
| 2019/0062529 A1 | 2/2019 | Isitman et al. | |
| 2019/0062532 A1 | 2/2019 | Isitman et al. | |
| 2019/0062533 A1* | 2/2019 | Isitman | C08L 91/00 |

OTHER PUBLICATIONS

Rolf Mildenberg, Hydrocarbon Resins, VCH Publishers, p. 141 (Year: 1997).*
European Search Report for Serial No. EP21172828 dated Oct. 14, 2021.

* cited by examiner

*Primary Examiner* — Deve V Hall
(74) *Attorney, Agent, or Firm* — Mandy B. Willis; John D. DeLong

(57) ABSTRACT

The present invention is directed to a pneumatic tire having a tread comprising a vulcanizable rubber composition comprising, based on 100 parts by weight of elastomer (phr), up to 100 phr of a solution polymerized styrene-butadiene rubber;

from 5 to 50 phr of a fatty acid monoester of formula 1

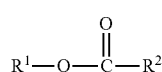

where $R^1$ is selected from C1 to C8 linear or branched alkyl, C1 to C8 linear or branched alkenyl, and C2 to C6 linear or branched alkyl substituted with from one to five hydroxyl groups; $R^2$ is C11 to C21 alkyl or C11 to C21 alkenyl;

from 5 to 50 phr of a hydrocarbon resin having a Tg ranging from −40° C. to 20° C.;

less than 10 phr of a petroleum-derived oil; and from 50 to 130 phr of silica.

optionally, from about 1 to 50 phr carbon black.

17 Claims, No Drawings

PNEUMATIC TIRE

BACKGROUND OF THE INVENTION

It is highly desirable for tires to have good wet skid resistance, low rolling resistance, and good wear characteristics. It has traditionally been very difficult to improve a tire's wear characteristics without sacrificing its wet skid resistance and traction characteristics. These properties depend, to a great extent, on the dynamic viscoelastic properties of the rubbers utilized in making the tire.

In order to reduce the rolling resistance and to improve the treadwear characteristics of tires, rubbers having a high rebound have traditionally been utilized in making tire tread rubber compounds. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads.

Tires are sometimes desired with treads for promoting traction on snowy surfaces. Various rubber compositions may be proposed for tire treads. Here, the challenge is to reduce the cured stiffness of such tread rubber compositions, as indicated by having a lower storage modulus G' at −20° C., when the tread is intended to be used for low temperature winter conditions, particularly for vehicular snow driving.

It is considered that significant challenges are presented for providing such tire tread rubber compositions for maintaining both their wet traction while promoting low temperature (e.g. winter) performance.

SUMMARY OF THE INVENTION

The present invention is directed to a pneumatic tire having a tread comprising a vulcanizable rubber composition comprising, based on 100 parts by weight of elastomer (phr), up to 100 phr of a solution polymerized styrene-butadiene rubber;

from 5 to 50 phr of a fatty acid monoester of formula 1

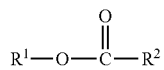

where $R^1$ is selected from C1 to C8 linear or branched alkyl, C1 to C8 linear or branched alkenyl, and C2 to C6 linear or branched alkyl substituted with from one to five hydroxyl groups; $R^2$ is C11 to C21 alkyl or C11 to C21 alkenyl;

from 5 to 50 phr of a hydrocarbon resin having a Tg ranging from −40° C. to 20° C.;

less than 10 phr of a petroleum-derived oil; and from 50 to 130 phr of silica.

optionally, from about 1 to 50 phr carbon black.

DESCRIPTION OF THE INVENTION

There is disclosed a pneumatic tire having a tread comprising a vulcanizable rubber composition comprising, based on 100 parts by weight of elastomer (phr), up to 100 phr of a solution polymerized styrene-butadiene rubber;

from 5 to 50 phr of a fatty acid monoester of formula 1

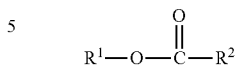

where $R^1$ is selected from C1 to C8 linear or branched alkyl, C1 to C8 linear or branched alkenyl, and C2 to C6 linear or branched alkyl substituted with from one to five hydroxyl groups; $R^2$ is C11 to C21 alkyl or C11 to C21 alkenyl;

from 5 to 50 phr of a hydrocarbon resin having a Tg ranging from −40° C. to 20° C.;

less than 10 phr of a petroleum-derived oil; and from 50 to 130 phr of silica.

optionally, from about 1 to 50 phr carbon black.

In one embodiment, the fatty acid monoester comprises at least one monoester selected from the group consisting of alkyl oleates, alkyl stearates, alkyl linoleates, and alkyl palmitates.

In one embodiment, the fatty acid monoester comprises at least 80 percent by weight of an alkyl oleate.

In one embodiment, the alkyl oleate is selected from the group consisting of methyl oleate, ethyl oleate, 2-ethylhexyl oleate, isopropyl oleate, and octyl oleate.

In one embodiment, the fatty acid monoester comprises at least 80 percent by weight of an oleate monoester.

In one embodiment, $R^1$ is C1 to C8 linear or branched alkyl.

In one embodiment, $R^1$ is selected from the group consisting of methyl, ethyl, 2-ethylhexyl, isopropyl, and octyl.

In one embodiment, the monoester of formula 1 is selected from the group consisting of monoesters of ethylene glycol, glycerol, trimethylolpropane, pentaerythritol, erythritol, xylitol, sorbitol, dulcitol, mannitol, and inositol.

In one embodiment, the rubber composition comprises from 40 to 55 phr of the fatty acid monoester of formula 1.

The rubber composition includes from 5 to 50 phr, alternatively from 20 to 40 phr, of a hydrocarbon resin having a glass transition temperature between −40° C. and +20° C. In one embodiment, the hydrocarbon resin has a Tg ranging between −40° C. and 0° C. In one embodiment, the hydrocarbon resin has a Tg ranging between −40° C. and −10° C. A suitable measurement of Tg for resins is DSC according to ASTM D6604 or equivalent. The hydrocarbon resin has a softening point between 0° C. and 70° C. as determined by ASTM E28 which might sometimes be referred to as a ring and ball softening point.

The hydrocarbon resin is selected from the group consisting of coumarone-indene resin, petroleum hydrocarbon resin, terpene polymers, styrene-alphamethylstyrene resins, terpene phenol resin, rosin derived resins and copolymers and/or mixtures thereof.

In one embodiment, the resin is a coumarone-indene resin containing coumarone and indene as the monomer components making up the resin skeleton (main chain). Monomer ingredients other than coumarone and indene which may be incorporated into the skeleton are, for example, methyl coumarone, styrene, alphamethylstyrene, methylindene, vinyltoluene, dicyclopentadiene, cycopentadiene, and diolefins such as isoprene and piperylene. Suitable coumarone-indene resin is available commercially as Novares® C series from Rutgers Novares GmbH.

Suitable petroleum resins include both aromatic and non-aromatic types. Several types of petroleum resins are available. Some resins have a low degree of unsaturation and high aromatic content, whereas some are highly unsaturated and yet some contain no aromatic structure at all. Differences in the resins are largely due to the olefins in the feedstock from which the resins are derived. Conventional derivatives in such resins include any C5 species (olefins and diolefins containing an average of five carbon atoms) such as cyclopentadiene, dicyclopentadiene, diolefins such as isoprene and piperylene, and any C9 species (olefins and diolefins containing an average of 9 carbon atoms) such as vinyltoluene, alphamethylstyrene and indene. Such resins are made by any mixture formed from C5 and C9 species mentioned above.

In one embodiment, said resin may be a terpene resin comprised of polymers of at least one of limonene, alpha pinene, beta pinene, and delta-3-carene.

The styrene/alphamethylstyrene resin is considered herein to be a relatively short chain copolymer of styrene and alphamethylstyrene. The styrene/alphamethylstyrene resin may have, for example, a styrene content in a range of from about 10 to about 90 percent. In one aspect, such a resin can be suitably prepared, for example, by cationic copolymerization of styrene and alphamethylstyrene in a hydrocarbon solvent. Thus, the contemplated styrene/alphamethylstyrene resin can be characterized, for example, by its chemical structure, namely, its styrene and alphamethylstyrene contents and by its glass transition temperature, molecular weight and molecular weight distribution. Suitable styrene/alphamethylstyrene resin is available commercially as PURE 20 AS from Rutgers Novares GmbH.

Terpene-phenol resins may be used. Terpene-phenol resins may be derived by copolymerization of phenolic monomers with terpenes such as limonenes, pinenes and delta-3-carene.

In one embodiment, the resin is a resin derived from rosin and derivatives. Representative thereof are, for example, gum rosin, wood rosin and tall oil rosin. Gum rosin, wood rosin and tall oil rosin have similar compositions, although the amount of components of the rosins may vary. Such resins may be dimerized, polymerized or disproportionated. Such resins may be in the form of esters of rosin acids and polyols such as pentaerythritol or glycol.

In one embodiment, said resin may be partially or fully hydrogenated.

The rubber composition includes a solution polymerized styrene-butadiene rubber. The solution polymerization prepared SBR (S-SBR) typically has a bound styrene content in a range of about 5 to about 50, preferably about 9 to about 26, percent. The S-SBR can be conveniently prepared, for example, by organo lithium catalyzation in the presence of an organic hydrocarbon solvent.

A reference to glass transition temperature, or Tg, of an elastomer or elastomer composition, where referred to herein, represents the glass transition temperature(s) of the respective elastomer or elastomer composition in its uncured state or possibly a cured state in a case of an elastomer composition. A Tg can be suitably determined as a peak midpoint by a differential scanning calorimeter (DSC) at a temperature rate of increase of 10° C. per minute, for example according to ASTM D7426 or equivalent.

In one embodiment, the solution polymerized styrene-butadiene rubber has a glass transition temperature in a range from –85° C. to 0° C.

In one embodiment, the styrene-butadiene rubber has a glass transition temperature (Tg) ranging from –85° C. to –50° C.

In one embodiment, the styrene-butadiene rubber has a glass transition temperature (Tg) ranging from –40° C. to 0° C.

In one embodiment, the styrene butadiene rubber includes a blend of two or more styrene-butadiene rubber of different Tg. Such a blend of styrene-butadiene rubbers may include functionalized, non-functionalized, or combination of functionalized and non-functionalized styrene-butadiene rubbers.

The styrene-butadiene rubber may be functionalized with various functional groups, or the styrene-butadiene rubber may be non-functionalized.

In one embodiment, the styrene-butadiene rubber is a functionalized styrene-butadiene rubber. Such functionalized styrene-butadiene rubber may be one or more functional groups appended to the polymer chain at either terminus or in-chain. Functional groups may be incorporated during polymerization as a function initiator or function terminator for terminal appendage, or as a functional monomer for in-chain insertion. Functional groups may include hydroxyl, amino, alkoxy, alkoxyamine, thiol, silane, alkoxysilane, alkoxyaminosilane, and the like. Such functional groups impart the ability of the functionalized styrene-butadiene rubber to react with surface active groups such as hydroxyl groups on silica to facilitate dispersion and interaction between the silica and functionalized styrene-butadiene rubber as mixed in a rubber compound.

In on embodiment the styrene-butadiene rubber is functionalized with an alkoxysilane group and at least one of a primary amine group and thiol group. In one embodiment, the styrene-butadiene rubber is obtained by copolymerizing styrene and butadiene, and characterized in that the styrene-butadiene rubber has a primary amino group and/or thiol group and an alkoxysilyl group which are bonded to the polymer chain. In one embodiment, the alkoxysilyl group is an ethoxysilyl group. In one embodiment, the styrene-butadiene rubber is not functionalized.

The primary amino group and/or thiol group may be bonded to any of a polymerization initiating terminal, a polymerization terminating terminal, a main chain of the styrene-butadiene rubber and a side chain, as long as it is bonded to the styrene-butadiene rubber chain. However, the primary amino group and/or thiol group is preferably introduced to the polymerization initiating terminal or the polymerization terminating terminal, in that the disappearance of energy at a polymer terminal is inhibited to improve hysteresis loss characteristics.

Further, the content of the alkoxysilyl group bonded to the polymer chain of the (co)polymer rubber is preferably from 0.5 to 200 mmol/kg of styrene-butadiene rubber. The content is more preferably from 1 to 100 mmol/kg of styrene-butadiene rubber, and particularly preferably from 2 to 50 mmol/kg of styrene-butadiene rubber.

The alkoxysilyl group may be bonded to any of the polymerization initiating terminal, the polymerization terminating terminal, the main chain of the (co)polymer and the side chain, as long as it is bonded to the (co)polymer chain. However, the alkoxysilyl group is preferably introduced to the polymerization initiating terminal or the polymerization terminating terminal, in that the disappearance of energy is inhibited from the (co)polymer terminal to be able to improve hysteresis loss characteristics.

The styrene-butadiene rubber can be produced by polymerizing styrene and butadiene in a hydrocarbon solvent by anionic polymerization using an organic alkali metal and/or an organic alkali earth metal as an initiator, adding a terminating agent compound having a primary amino group protected with a protective group and/or a thiol group protected with a protecting group and an alkoxysilyl group to react it with a living polymer chain terminal at the time when the polymerization has substantially completed, and then conducting deblocking, for example, by hydrolysis or other appropriate procedure. In one embodiment, the styrene-butadiene rubber can be produced as disclosed in U.S. Pat. No. 7,342,070. In another embodiment, the styrene-butadiene rubber can be produced as disclosed in WO 2007/047943.

In one embodiment, and as taught in U.S. Pat. No. 7,342,070, the styrene-butadiene rubber is of the formula (I) or (II)

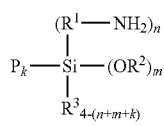
I wherein P is a (co)polymer chain of a conjugated diolefin or a conjugated diolefin and an aromatic vinyl compound, $R^1$ is an alkylene group having 1 to 12 carbon atoms, $R^2$ and $R^3$ are each independently an alkyl group having 1 to 20 carbon atoms, an allyl group or an aryl group, n is an integer of 1 or 2, m is an integer of 1 or 2, and k is an integer of 1 or 2, with the proviso that n+m+k is an integer of 3 or 4,

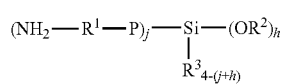
II wherein P, $R^1$, $R^2$ and $R^3$ have the same definitions as give for the above-mentioned formula I, j is an integer of 1 to 3, and h is an integer of 1 to 3, with the provision that j+h is an integer of 2 to 4.

The terminating agent compound having a protected primary amino group and an alkoxysilyl group may be any of various compounds as are known in the art. In one embodiment, the compound having a protected primary amino group and an alkoxysilyl group may include, for example, N,N-bis(trimethylsilyl)aminopropylmethyldimethoxysilane, 1-trimethylsilyl-2,2-dimethoxy-1-aza-2-silacyclopentane, N,N-bis(trimethylsilyl)aminopropyltrimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)-aminoethyltriethoxysilane, N,N-bis(trimethylsilyl)aminoethylmethyldimethoxysilane, N,N-bis(trimethylsilyl)aminoethylmethyldiethoxysilane, etc., and preferred are 1-trimethylsilyl-2,2-dimethoxy-1-aza-2-silacyclopentane, N,N-bis(trimethylsilyl) aminopropylmethyldimethoxysilane and N,N-bis(trimethylsilyl)aminopropylmethyldiethoxysilane. In one embodiment, the compound having a protected primary amino group and an alkoxysilyl group is N,N-bis(trimethylsilyl)aminopropyltriethoxysilane.

In one embodiment, the compound having a protected primary amino group and an alkoxysilyl group may be any compound of formula III

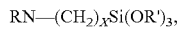
III wherein R in combination with the nitrogen (N) atom is a protected amine group which upon appropriate post-treatment yields a primary amine, R' represents a group having 1 to 18 carbon atoms selected from an alkyl, a cycloalkyl, an allyl, or an aryl; and X is an integer from 1 to 20. In one embodiment, at least one R' group is an ethyl radical. By appropriate post-treatment to yield a primary amine, it is meant that subsequent to reaction of the living polymer with the compound having a protected primary amino group and an alkoxysilyl group, the protecting groups are removed. For example, in the case of bis(trialkylsilyl) protecting group as in N,N-bis(trimethylsilyl)aminopropyltriethoxysilane, hydrolysis is used to remove the trialkylsilyl groups and leave the primary amine.

In one embodiment, the rubber composition includes from about 40 to about 60 phr of styrene-butadiene rubber functionalized with an alkoxysilane group and a primary amine group or thiol group.

Suitable styrene-butadiene rubbers functionalized with an alkoxysilane group and a primary amine group are available commercially, such as HPR 340 from Japan Synthetic Rubber (JSR).

In one embodiment, the solution polymerized styrene-butadiene rubber is as disclosed in WO 2007/047943 and is functionalized with an alkoxysilane group and a thiol, and comprises the reaction product of a living anionic polymer and a silane-sulfide modifier represented by the formula IV

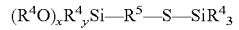
IV wherein Si is silicon; S is sulfur; O is oxygen; x is an integer selected from 1, 2 and 3; y is an integer selected from 0, 1, and 2; x+y=3; $R^4$ is the same or different and is $(C_1-C_{16})$ alkyl; and R' is aryl, and alkyl aryl, or $(C_1-C_{16})$ alkyl. In one embodiment, $R^5$ is a $(C_1-C_{16})$ alkyl. In one embodiment, each $R^4$ group is the same or different, and each is independently a $C_1-C_5$ alkyl, and $R^5$ is $C_1-C_5$ alkyl.

Suitable styrene-butadiene rubbers functionalized with an alkoxysilane group and a thiol group are available commercially, such as Sprintan SLR 3402 or Sprintan SLR 4602 from Trinseo.

In one embodiment, the styrene-butadiene rubber in the rubber composition is present in an amount ranging up to 100 phr. In one embodiment, the styrene-butadiene rubber is present in an amount ranging from 10 to 90 phr, along with 90 to 10 phr of at least one additional diene based elastomer. In one embodiment, the styrene-butadiene rubber is present in an amount ranging from 30 to 70 phr, along with 70 to 30 phr of at least one additional diene based elastomer.

The rubber composition optionally includes one or more additional rubbers or elastomers containing olefinic unsaturation. The phrases "rubber or elastomer containing olefinic unsaturation" or "diene based elastomer" are intended to include both natural rubber and its various raw and reclaim forms as well as various synthetic rubbers. In the description of this invention, the terms "rubber" and "elastomer" may be used interchangeably, unless otherwise prescribed. The terms "rubber composition," "compounded rubber" and "rubber compound" are used interchangeably to refer to rubber which has been blended or mixed with various ingredients and materials and such terms are well known to those having skill in the rubber mixing or rubber compounding art. Specific examples of synthetic rubbers include polybutadiene (including cis 1,4 polybutadiene), polyisoprene (including cis 1,4 polyisoprene), butyl rubber, styrene/isoprene/butadiene rubber, copolymers of 1,3 butadiene or isoprene with styrene. Additional examples of rubbers which may be used include alkoxy-silyl end functionalized solution polymerized polymers (SBR, PBR, IBR and SIBR), silicon-coupled and tin-coupled star-branched polymers. The preferred rubber or elastomers are polyisoprene (natural or synthetic), polybutadiene and SBR.

In one aspect the at least one additional rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene.

By emulsion polymerization prepared E-SBR, it is meant that styrene and 1,3 butadiene are copolymerized as an aqueous emulsion. Such are well known to those skilled in such art. The bound styrene content can vary, for example, from about 5 to about 50 percent.

The solution polymerization prepared SBR (S-SBR) typically has a bound styrene content in a range of about 5 to about 50, preferably about 9 to about 26, percent. The S-SBR can be conveniently prepared, for example, by organo lithium catalyzation in the presence of an organic hydrocarbon solvent.

In one embodiment, cis-1,4 polybutadiene rubber (BR) may be used. Such BR can be prepared, for example, by organic solution polymerization of 1,3-butadiene. The BR may be conveniently characterized, for example, by having at least a 90 percent cis 1,4-content and a glass transition temperature Tg in a range of from about −95° C. to about −110° C.

In one embodiment, natural rubber or synthetic cis-1,4 polyisoprene may be used.

The rubber composition may include up to 10 phr of a processing oil. In one embodiment, the amount of processing oil ranges from 1 to 5 phr. In one embodiment, the rubber composition is devoid of processing oil. Processing oil may be included in the rubber composition as extending oil typically used to extend elastomers. Processing oil may also be included in the rubber composition by addition of the oil directly during rubber compounding. The processing oil used may include both extending oil present in the elastomers, and process oil added during compounding. Suitable process oils include various oils as are known in the art, including aromatic, paraffinic, naphthenic, and low PCA oils, such as MES, TDAE, and heavy naphthenic oils, and vegetable oils such as sunflower, soybean, and safflower oils.

In one embodiment, the rubber composition includes a low PCA oil. Suitable low PCA oils include but are not limited to mild extraction solvates (MES), treated distillate aromatic extracts (TDAE), and heavy naphthenic oils as are known in the art; see for example U.S. Pat. Nos. 5,504,135; 6,103,808; 6,399,697; 6,410,816; 6,248,929; 6,146,520; U.S. Published Applications 2001/00023307; 2002/0000280; 2002/0045697; 2001/0007049; EP0839891; JP2002097369; ES2122917. Generally, suitable low PCA oils include those having a glass transition temperature Tg in a range of from about −40° C. to about −80° C. MES oils generally have a Tg in a range of from about −57° C. to about −63° C. TDAE oils generally have a Tg in a range of from about −44° C. to about −50° C. Heavy naphthenic oils generally have a Tg in a range of from about −42° C. to about −48° C. A suitable measurement for Tg of TDAE oils is DSC according to ASTM E1356, or equivalent.

Suitable low PCA oils include those having a polycyclic aromatic content of less than 3 percent by weight as determined by the IP346 method. Procedures for the IP346 method may be found in *Standard Methods for Analysis & Testing of Petroleum and Related Products* and *British Standard 2000 Parts,* 2003, 62nd edition, published by the Institute of Petroleum, United Kingdom.

Suitable TDAE oils are available as Tudalen SX500 from Klaus Dahleke KG, VivaTec 400 and VivaTec 500 from H&R Group, and Enerthene 1849 from BP, and Extensoil 1996 from Repsol. The oils may be available as the oil alone or along with an elastomer in the form of an extended elastomer.

Suitable vegetable oils include, for example, soybean oil, sunflower oil and canola oil which are in the form of esters containing a certain degree of unsaturation.

The vulcanizable rubber composition may include from about 50 to about 130 phr of silica.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society,* Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, 315 etc.; silicas available from Rhodia, with, for example, designations of Z1165MP and Z165GR and silicas available from Degussa AG with, for example, designations VN2 and VN3, etc.

The vulcanizable rubber composition may optionally include from about 1 to about 50 phr of carbon black.

Commonly employed carbon blacks can be used as a conventional filler. Representative examples of such carbon blacks include N110, N121, N134, N220, N231, N234, N242, N293, N299, 5315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP number ranging from 34 to 150 cm$^3$/100 g.

Other fillers may be used in the rubber composition including, but not limited to, particulate fillers including ultra high molecular weight polyethylene (UHMWPE), particulate polymer gels such as those disclosed in U.S. Pat. Nos. 6,242,534; 6,207,757; 6,133,364; 6,372,857; 5,395, 891; or 6,127,488, and plasticized starch composite filler such as that disclosed in U.S. Pat. No. 5,672,639.

It may be preferred to have the rubber composition for use in the tire component to additionally contain a conventional sulfur containing organosilicon compound. Examples of suitable sulfur containing organosilicon compounds are of the formula 2:

Z-Alk-S$_n$-Alk-Z    2 in which Z is selected from the group consisting of

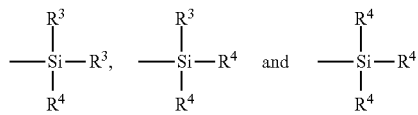

where $R^3$ is an alkyl group of 1 to 4 carbon atoms, cyclohexyl or phenyl; $R^4$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis (triethoxysilylpropyl) disulfide, 3,3'-bis (triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis (trimethoxysilylpropyl) hexasulfide, 3,3'-bis (trimethoxysilylpropyl) octasulfide, 3,3'-bis (trioctoxysilylpropyl) tetrasulfide, 3,3'-bis (trihexoxysilylpropyl) disulfide, 3,3'-bis(tri-2"-ethylhexoxysilylpropyl) trisulfide, 3,3'-bis (triisooctoxysilylpropyl) tetrasulfide, 3,3'-bis(tri-t-butoxysilylpropyl) disulfide, 2,2'-bis(methoxy diethoxysilyl ethyl) tetrasulfide, 2,2'-bis(tripropoxysilylethyl) pentasulfide, 3,3'-bis(tricyclonexoxysilylpropyl) tetrasulfide, 3,3'-bis (tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis (methyl ethoxypropoxysilylethyl) tetrasulfide, 3,3'-bis (diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis (dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxysilylpropyl) sulfides. The most preferred compounds are 3,3'-bis(triethoxysilylpropyl) disulfide and 3,3'-bis(triethoxysilylpropyl) tetrasulfide. Therefore, as to formula 2, preferably Z is

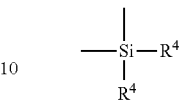

where $R^4$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

In another embodiment, suitable sulfur containing organosilicon compounds include compounds disclosed in U.S. Pat. No. 6,608,125. In one embodiment, the sulfur containing organosilicon compounds includes 3-(octanoylthio)-1-propyltriethoxysilane, $CH_3(CH_2)_6C(=O)-S-CH_2CH_2CH_2Si(OCH_2CH_3)_3$, which is available commercially as NXT™ from Momentive Performance Materials.

In another embodiment, suitable sulfur containing organosilicon compounds include compounds disclosed in U.S. Publication 2006/0041063. In one embodiment, the sulfur containing organosilicon compounds include the reaction product of hydrocarbon based diol (e.g., 2-methyl-1,3-propanediol) with S-[3-(triethoxysilyl)propyl] thiooctanoate. In one embodiment, the sulfur containing organosilicon compound is NXT-Z™ from Momentive Performance Materials.

In another embodiment, suitable sulfur containing organosilicon compounds include those disclosed in U.S. Patent Publication No. 2003/0130535. In one embodiment, the sulfur containing organosilicon compound is Si-363 from Degussa.

The amount of the sulfur containing organosilicon compound of formula 2 in a rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders, fillers, pigments, fatty acid, zinc oxide, waxes, antioxidants and antiozonants and peptizing agents. As known to those skilled in the art, depending on the intended use of the sulfur vulcanizable and sulfur-vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. In one embodiment, the sulfur-vulcanizing agent is elemental sulfur. The sulfur-vulcanizing agent may be used in an amount ranging from 0.5 to 8 phr, alternatively with a range of from 1.5 to 6 phr. Typical amounts of antioxidants comprise about 1 to about 5 phr. Representative antioxidants may be, for example, diphenyl-p-phenylenediamine and others, such as, for example, those disclosed in The Vanderbilt Rubber Handbook (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, alternatively about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound.

The mixing of the rubber composition can be accomplished by methods known to those having skill in the rubber mixing art. For example, the ingredients are typically mixed in at least two stages, namely, at least one non-productive stage followed by a productive mix stage. The final curatives including sulfur-vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The terms "non-productive" and "productive" mix stages are well known to those having skill in the rubber mixing art. The rubber composition may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions, and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. In one embodiment, the component is a tread.

The pneumatic tire of the present invention may be a race tire, passenger tire, aircraft tire, agricultural, earthmover, off-the-road, truck tire, and the like. In one embodiment, the tire is a passenger or truck tire. The tire may also be a radial or bias.

Vulcanization of the pneumatic tire of the present invention is generally carried out at conventional temperatures ranging from about 100° C. to 200° C. In one embodiment, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

Rubber compounds were mixed according to the formulations shown in Table 1 including standard amounts of additives and curatives, with amounts given in phr. The compounds were cured and tested for physical properties as shown in Table 2. Compounds C1 and C2 were controls, and compounds E1-E4 were representative of the invention.

Compound Sample C1 contains naphthenic oil to promote rubber processing and snow grip performance of the silica reinforced cured rubber composition with tin coupled solution polymerized SBR and high-cis polybutadiene. Compound Sample E1 is made by modifying the Sample C1 composition where the naphthenic oil is replaced by a combination of traction promoting hydrocarbon resin and a mono ester of high oleic sunflower oil. It is noted that the predicted snow grip performance is improved as evidenced by a reduction in the G' property measured at −20° C. from 13.8 MPa to 10.7 MPa. Furthermore, the predicted rolling resistance is significantly improved as observed by an increased rebound property at 23° C. from 34 to 38. Predicted treadwear performance is improved as abrasion rate is reduced from 71 to 50 mm$^3$. This is achieved without a significant change in the predicted wet traction as the rebound property at 0° C. is similar to that of Sample C1. Compound Sample E2 is made by modifying the Sample C1 composition where the naphthenic oil is replaced by a combination of traction promoting hydrocarbon resin and soy bean oil. It is noted that similar improvements are obtained in properties predictive of snow grip, treadwear and rolling resistance without substantially compromising the property predictive of wet grip.

Compound Sample C2 contains naphthenic oil to promote rubber processing and snow grip performance of the silica reinforced cured rubber composition with functionalized, tin coupled solution polymerized SBR and high-cis polybutadiene. Compound Sample E3 is made by modifying the Sample C2 composition where the naphthenic oil is replaced by a combination of traction promoting hydrocarbon resin and a mono ester of high oleic sunflower oil. It is noted that the predicted snow grip performance is improved as evidenced by a reduction in the G' property measured at −20° C. from 13.9 MPa to 7.6 MPa. Furthermore, the predicted rolling resistance is significantly improved as observed by an increased rebound property at 23° C. from 35 to 39. Predicted treadwear performance is improved as abrasion rate is reduced from 63 to 48 mm$^3$. This is achieved without a significant change in the predicted wet traction as the rebound property at 0° C. is similar to that of Sample C2. Compound Sample E4 is made by modifying the Sample C2 composition where the naphthenic oil is replaced by a combination of traction promoting hydrocarbon resin and soy bean oil. It is noted that similar improvements are obtained in properties predictive of snow grip, treadwear and rolling resistance without substantially compromising the property predictive of wet grip.

TABLE 1

| | Composition | | | | | |
|---|---|---|---|---|---|---|
| | C1 | C2 | E1 | E2 | E3 | E4 |
| Styrene-butadiene rubber (A) [1] | 60 | 0 | 60 | 60 | 0 | 0 |
| Styrene-butadiene rubber (B) [2] | 0 | 60 | 0 | 0 | 60 | 60 |
| Polybutadiene | 40 | 40 | 40 | 40 | 40 | 40 |
| Naphthenic oil | 37.5 | 0 | 0 | 0 | 0 | 0 |
| TDAE oil | 0 | 37.5 | 0 | 0 | 0 | 0 |
| Traction resin [3] | 0 | 0 | 30 | 25 | 30 | 25 |
| Vegetable oil D (Tg = −110° C.) [4] | 0 | 0 | 7.5 | 0 | 7.5 | 0 |
| Vegetable oil C (Tg = −90° C.) [5] | 0 | 0 | 0 | 12.5 | 0 | 12.5 |
| Silica | 90 | 90 | 90 | 90 | 90 | 90 |

[1] Tin coupled, styrene/butadiene rubber of Tg about −25° C. obtained from Trinseo as Sprintan ® SLR4601.
[2] Functionalized, tin coupled, styrene/butadiene rubber of Tg about −25° C. obtained from Trinseo as Sprintan ® SLR4602.
[3] Coumarone-indene resin, Tg = −30° C., obtained as Novares ® C10 from Rutgers
[4] mono ester of high oleic sunflower oil, Tg = −110° C., obtained as Pionier TP130B from HUR.
[5] soybean oil

TABLE 2

| | Composition | | | | | |
|---|---|---|---|---|---|---|
| | C1 | C2 | E1 | E2 | E3 | E4 |
| Tensile properties[1] | | | | | | |
| Modulus at 300% strain (MPa) | 8.7 | 9.0 | 9.0 | 8.9 | 9.4 | 8.9 |
| Tensile strength (MPa) | 16.3 | 17.5 | 16.6 | 17.8 | 18.2 | 18.3 |
| Elongation at break (%) | 501 | 504 | 490 | 526 | 501 | 525 |
| Predicted snow grip property[2] | | | | | | |
| G' 3% strain, −20° C. (MPa) | 13.8 | 13.9 | 10.7 | 10.6 | 7.6 | 11.4 |
| Predicted wet grip property[3] | | | | | | |
| Rebound at 0° C. | 20 | 19 | 21 | 21 | 21 | 22 |
| Predicted Rolling Resistance property[3] | | | | | | |
| Rebound at 23° C. | 34 | 35 | 38 | 37 | 39 | 39 |
| Predicted Treadwear property[4] | | | | | | |
| DIN abrasion (mm³) | 71 | 63 | 50 | 57 | 48 | 54 |

[1] Data according to Automated Testing System instrument by the Instron Corporation. Such instrument may determine ultimate tensile, ultimate elongation, modulii, etc. Data reported in the Table is generated by running the ring tensile test station which is an Instron 4201 load frame.
[2] The G' modulus at low temperatures can be readily be determined by an ARES rheometer by TA Instruments at 3 percent strain and 10 Hertz.
[3] Rebound is a measure of hysteresis of the compound when subject to loading, as measured by ASTM D1054.
[4] Data according to DIN 53516 abrasion resistance test procedure using a Zwick drum abrasion unit, model 6102 with 2.5 Newtons force. DIN standards are German test standards. The DIN abrasion results are reported as relative values to a control rubber composition used by the laboratory.

While certain representative embodiments and details have been shown for the purpose of illustrating the subject invention, it will be apparent to those skilled in this art that various changes and modifications can be made therein without departing from the scope of the subject invention.

The invention claimed is:

1. A pneumatic tire having a tread comprising a vulcanizable rubber composition comprising, based on 100 parts by weight of elastomer (phr),
   up to 100 phr of a solution polymerized styrene-butadiene rubber;
   from 5 to 15 phr of a fatty acid monoester of formula 1

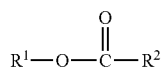

where $R^1$ is selected from C1 to C8 linear or branched alkyl, C1 to C8 linear or branched alkenyl, and C2 to C6 linear or branched alkyl substituted with from one to five hydroxyl groups; $R^2$ is C11 to C21 alkyl or C11 to C21 alkenyl;
   from 5 to 50 phr of a hydrocarbon resin having a Tg ranging from −40° C. to 20° C.;
   less than 10 phr of a petroleum-derived oil;
   from 50 to 130 phr of silica; and
   optionally, from about 1 to 50 phr carbon black;
   wherein the rubber composition is devoid of traction resins greater than 20° C.

2. The pneumatic tire of claim 1, wherein the hydrocarbon resin having a Tg ranging from −40° C. to 20° C. is a coumarone-indene resin.

3. The pneumatic tire of claim 1, wherein the hydrocarbon resin having a Tg ranging from −40° C. to 20° C. resin is derived from styrene and alphamethylstyrene.

4. The pneumatic tire of claim 1, the styrene-butadiene rubber has a glass transition temperature (Tg) ranging from −85° C. to −50° C.

5. The pneumatic tire of claim 1, the styrene-butadiene rubber has a glass transition temperature (Tg) ranging from −40° C. to 0° C.

6. The pneumatic tire of claim 1, wherein the coumarone-indene resin having a Tg ranging from −40° C. to 20° C. comprises residues of coumarone, indene, and at least one residues selected from the group consisting of methyl coumarone, styrene, α-methylstyrene, methylindene, vinyltoluene, dicyclopentadiene, cycopentadiene, and diolefins.

7. The pneumatic tire of claim 1, wherein the monoester of formula 1 is selected from the group consisting of monoesters of ethylene glycol, glycerol, trimethylolpropane, pentaerythritol, erythritol, xylitol, sorbitol, dulcitol, mannitol, and inositol.

8. The pneumatic tire of claim 1, wherein $R^1$ is selected from the group consisting of methyl, ethyl, 2-ethylhexyl, isopropyl, and octyl.

9. The pneumatic tire of claim 1, wherein $R^1$ is C1 to C8 linear or branched alkyl.

10. The pneumatic tire of claim 1, wherein the fatty acid monoester comprises at least one monoester selected from the group consisting of alkyl oleates, alkyl stearates, alkyl linoleates, and alkyl palmitates.

11. The pneumatic tire of claim 1, wherein the fatty acid monoester comprises at least 80 percent by weight of an alkyl oleate.

12. The pneumatic tire of claim 6, wherein the alkyl oleate is selected from the group consisting of methyl oleate, ethyl oleate, 2-ethylhexyl oleate, isopropyl oleate, and octyl oleate.

13. The pneumatic tire of claim 1, comprising a second elastomer selected from the group consisting of natural rubber, polybutadiene, synthetic polyisoprene, solution polymerized styrene-butadiene rubber, and emulsion polymerized styrene-butadiene rubber.

14. The pneumatic tire of claim 1, wherein the fatty acid monoester comprises at least 80 percent by weight of an oleate monoester.

15. The pneumatic tire of claim 1, wherein the styrene-butadiene rubber is functionalized.

16. The pneumatic tire of claim 1, wherein the rubber composition comprises from 10 to 90 phr of the styrene-butadiene rubber and from 90 to 10 phr of at least one additional diene based elastomer.

17. The pneumatic tire of claim 1, wherein the rubber composition comprises from 30 to 70 phr of the styrene-butadiene rubber and from 70 to 30 phr of at least one additional diene based elastomer.

\* \* \* \* \*